(12) United States Patent
Zimmel

(10) Patent No.: US 6,885,798 B2
(45) Date of Patent: Apr. 26, 2005

(54) FIBER OPTIC CABLE AND FURCATION MODULE

(75) Inventor: Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 20 days.

(21) Appl. No.: 10/658,802

(22) Filed: Sep. 8, 2003

(65) Prior Publication Data

US 2005/0053341 A1 Mar. 10, 2005

(51) Int. Cl.[7] .............................. G02B 6/00; G02B 6/44; B65H 59/00; B65H 18/08
(52) U.S. Cl. ..................... 385/100; 385/109; 242/410
(58) Field of Search ..................... 385/100–110, 147; 242/410, 520, 176, 178; 405/154.1

(56) References Cited

U.S. PATENT DOCUMENTS

| | | | | |
|---|---|---|---|---|
| 5,740,295 A | * | 4/1998 | Kinard et al. ............... | 385/109 |
| 6,618,538 B2 | * | 9/2003 | Nechitailo et al. .......... | 385/134 |
| 2002/0061231 A1 | * | 5/2002 | Finzel et al. ............. | 405/154.1 |
| 2002/0117572 A1 | * | 8/2002 | Nechitailo et al. .......... | 242/410 |
| 2002/0145069 A1 | * | 10/2002 | Nechitailo et al. .......... | 242/520 |

OTHER PUBLICATIONS

Color Copy of Photograph displaying a cluster of fiber optic splitters labeled "A", no date.
FOnetworks, Inc. FOnetworks 6 and 12 Fiber Ribbon Fanout Assemblies; 3 pages total, no date.

* cited by examiner

*Primary Examiner*—Akm Enayet Ullah
(74) *Attorney, Agent, or Firm*—Merchant & Gould PC

(57) ABSTRACT

An optical fiber cable assembly comprising an optical fiber slidably enclosed within a hollow tubing, both the fiber and the tubing having corresponding first and second ends. The cable is terminated with the first and second ends of the tubing and the fiber constrained with respect to each other such that fiber and the tubing are approximately the same length when the cable is at a first temperature. The tubing is made of a material which contracts more than the optical fiber when the cable is exposed to temperatures below the first temperature, such that the fiber is longer than the tubing and excess fiber length is formed. An intermediate portion of the tubing permits the excess fiber length to accumulate without bending in a radius smaller than a minimum bend radius.

23 Claims, 10 Drawing Sheets

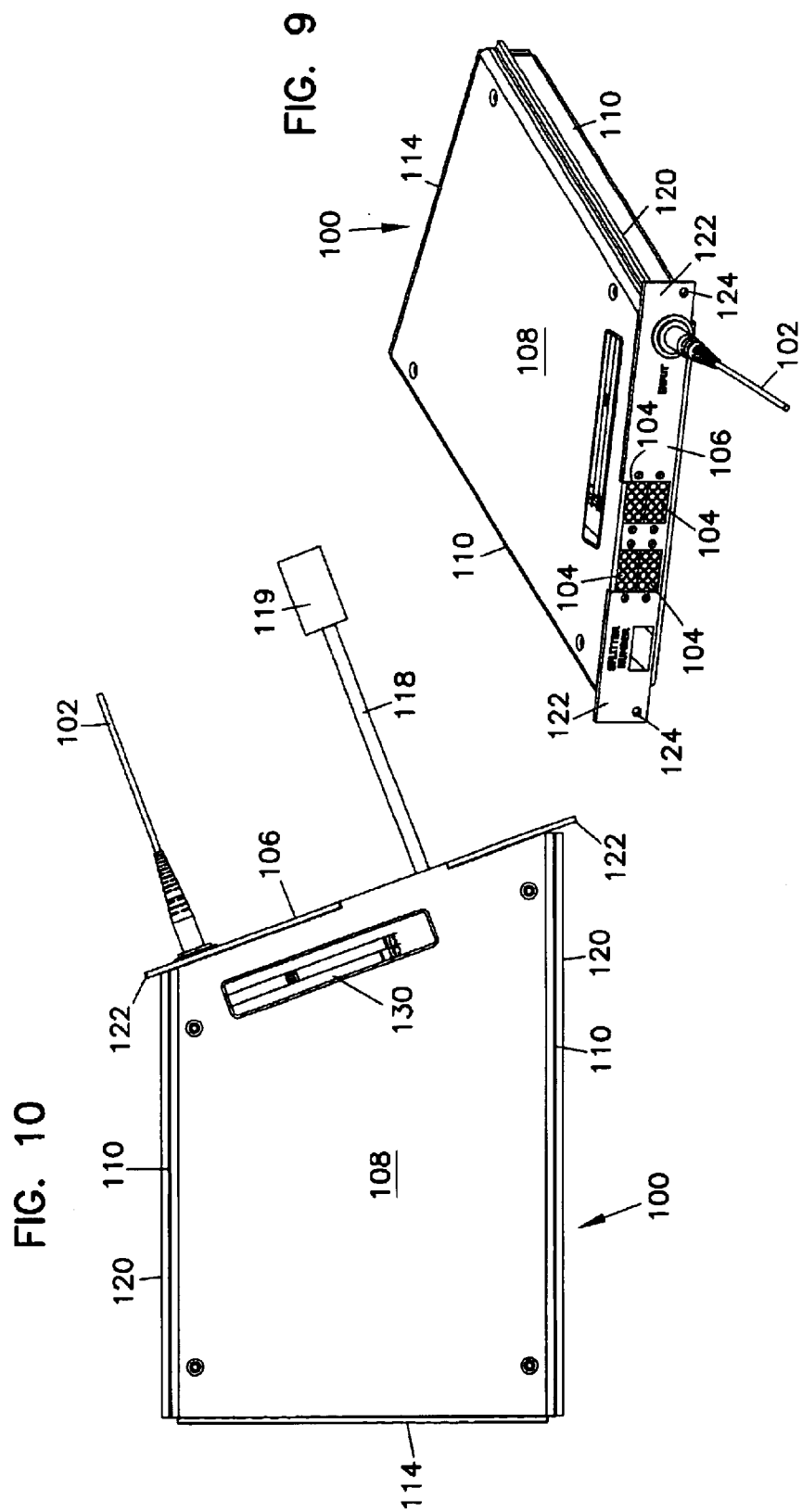

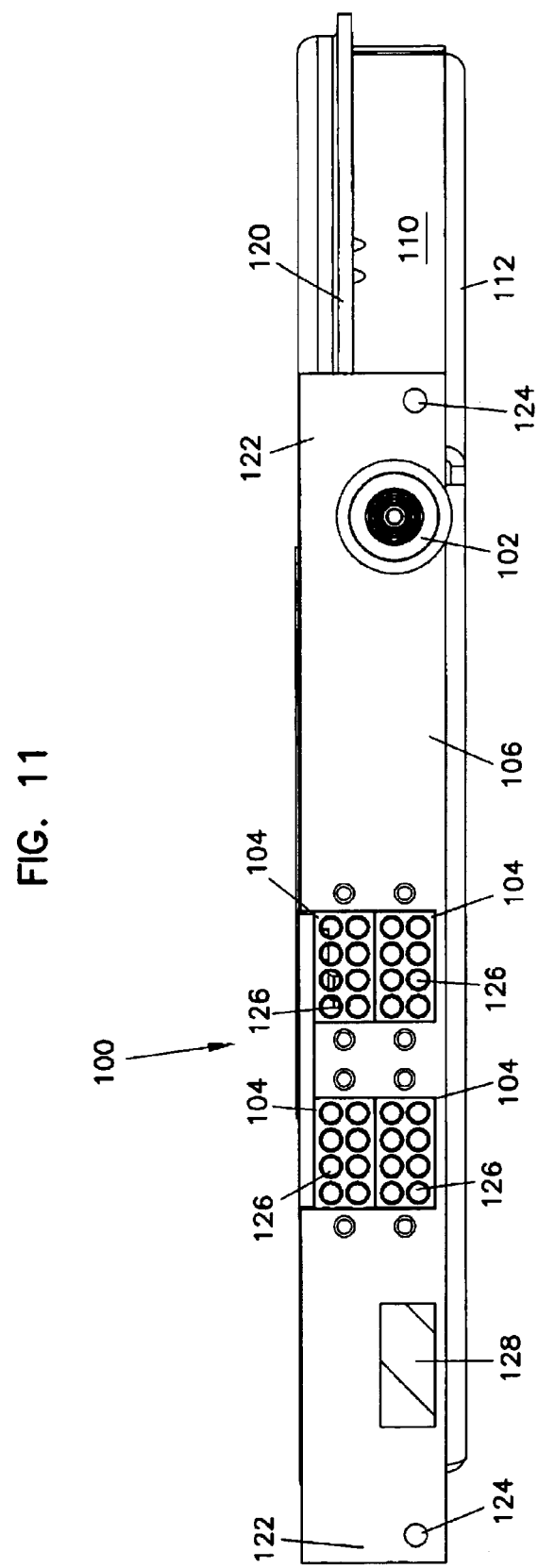

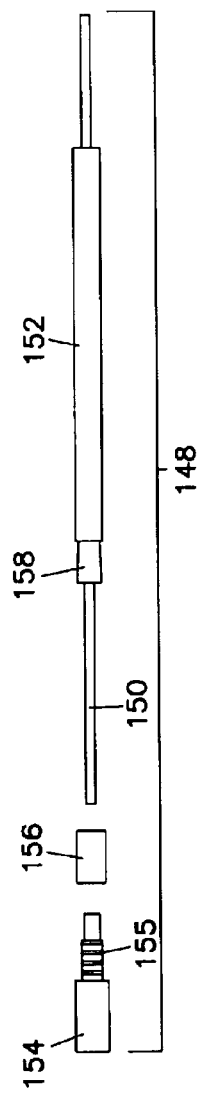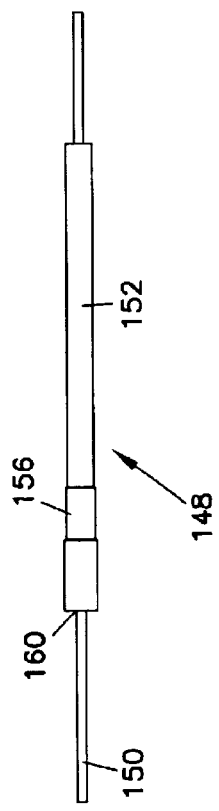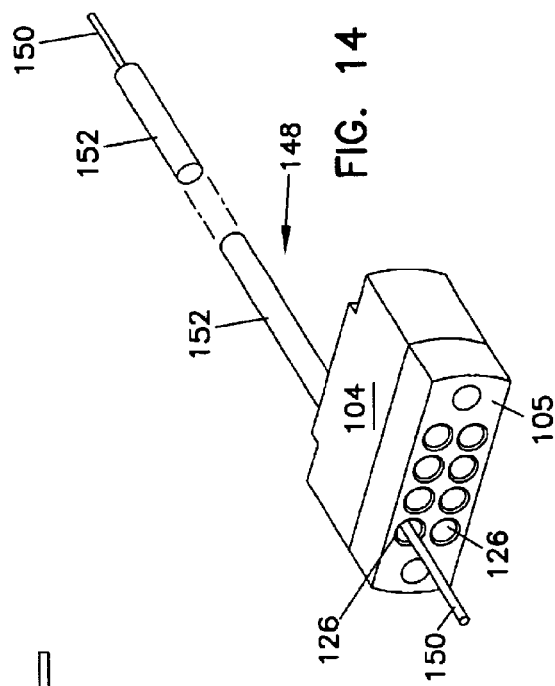

US 6,885,798 B2

FIBER OPTIC CABLE AND FURCATION MODULE

FIELD

The present invention generally relates to optical fiber cable construction and furcation module construction.

BACKGROUND

Optical fiber cables are typically composed of a variety of linear elements which are terminated and constrained linearly with respect to each other. These elements may include the optical fiber itself, tubular sheathing materials, linear strength members, and outer layers for sealing the other elements from environmental damage from rain or other moisture. Each of these elements may have different thermal coefficients of expansion. At temperatures near the ambient temperature present when the cable is assembled and terminated, the differences in thermal expansion of the various elements is not significant enough to cause any attenuation or insertion loss to optical signals being transmitted by the cable.

However, as these cables are exposed to temperatures more extreme with respect to the ambient temperature at the time of assembly and termination, the differing thermal expansion coefficients may become more significant. Optical fiber cables may be exposed to operating temperatures up to one hundred degrees Fahrenheit removed from the ambient temperature of assembly and termination. At these temperatures, the differing degrees of elongation or contraction among the elements of the cable may damage the fiber or may cause unacceptable amounts of attenuation or insertion loss of signals being transmitted over the cable. Improvements to known optical fiber cables to address temperature-induced stresses are desirable.

SUMMARY

The present invention relates to an optical fiber cable assembly comprising an optical fiber slidably enclosed within a hollow tubing, both the fiber and the tubing having corresponding first and second ends. The cable is terminated with the first and second ends of the tubing and the fiber constrained with respect to each other such that fiber and the tubing are approximately the same length when the cable is at a first temperature. The tubing is made of a material which contracts more than the optical fiber when the cable is exposed to temperatures below the first temperature, such that the fiber is longer than the tubing and excess fiber length is formed relative to the tubing. A fiber receiving device is provided for receiving the excess fiber length when the tubing contracts more than the fiber. In one preferred embodiment, the fiber receiving device is an intermediate portion of the tubing permits the excess fiber length to accumulate without bending in a radius smaller than a minimum bend radius.

The present invention further relates to an optical fiber cable assembly comprising an optical fiber slidably enclosed within a hollow tubing, both the fiber and the tubing having corresponding first and second ends. The second ends of the fiber and the tubing are constrained with respect to each other. The first end of the fiber constrained beyond where the first end of the tubing is constrained. The cable is assembled at a first temperature and at a second lower temperature the tubing shrinks in length relative to the fiber and any excess fiber length accumulates beyond the first end of the tube.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 9 is a front perspective view of an optical fiber module in accordance with the present invention.

FIG. 10 is a top view of the optical fiber module of FIG. 9.

FIG. 11 is a front view of the optical fiber module of FIG. 9.

FIG. 14 is a rear perspective view one of the optical fiber up-jacket mounting blocks from the front of the module of FIG. 9, with a single up-jacket tubing assembly mounted within one of the mounting openings for sheathing one of the plurality of fibers extending from splitter.

FIG. 15 is a side view of the optical fiber up-jacket tubing assembly from FIG. 13.

FIG. 16 is an exploded view of the optical fiber up-jacket tubing assembly of FIG. 15.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
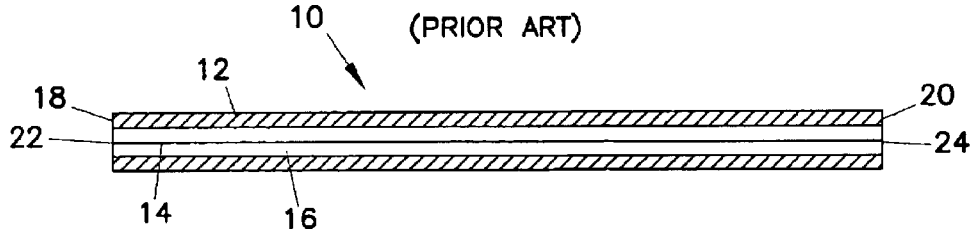
FIG. 1 is a cross-sectional view of a prior art optical fiber cable segment.
Figure 2:
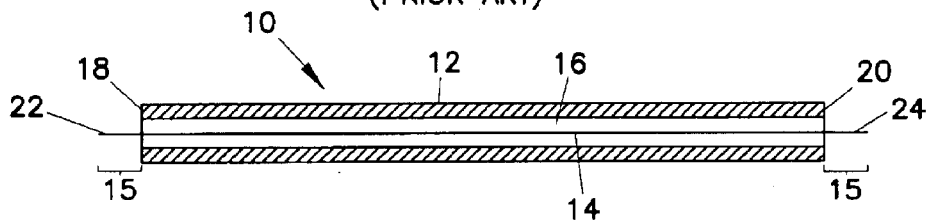
FIG. 2 is a cross-sectional view of the prior art optical fiber cable segment of FIG. 1 at a reduced ambient temperature where the ends of the fiber and the cable jacket are not constrained with respect to each other.
Figure 3:
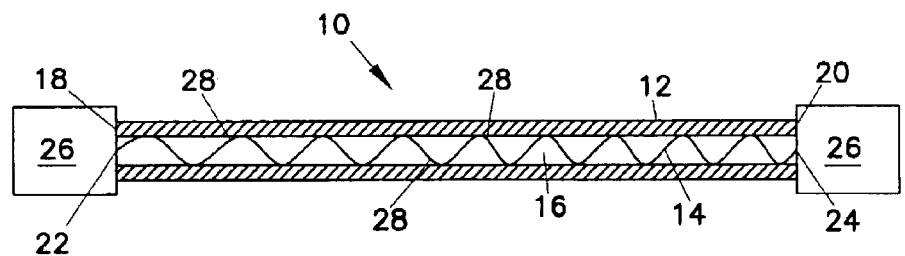
FIG. 3 is a cross-sectional view of the prior art optical fiber cable segment of FIG. 1 at a reduced temperature where the ends of the fiber and the cable jacket are constrained with respect to each other.

Optical fiber cables may be installed within telecommunications networks and exposed to the extremes of outside air temperatures. These optical fiber cables are made of a variety of materials, including but not limited to the optical fiber itself, jacketing and cladding, and strength members. Each of these constituent materials may have a different thermal coefficient of expansion, meaning that the materials will expand or contract at different rates due to temperature changes. The prior art optical fiber cables in FIGS. 1 to 3 show the effect of reduced temperature on an optical fiber cable 10 including an outer jacket 12 and an optical fiber 14. Fiber 14 is slidably held within a hollow opening 16 defined by jacket 12. Jacket 12 includes a first end 18 and an opposing second end 20 and fiber 14 includes corresponding first and second ends 22 and 24.

In FIG. 1, cable 10 is exposed to a first temperature such that the ends of fiber 14 and jacket 12 are aligned with each other. If fiber 14 and jacket 12 were originally the same length at the time of their assembly, this indicates that the first temperature is approximately equal to the ambient temperature at which cable 10 was assembled. Cable 10 may be an optical fiber drop cable where fiber 14 is freely slidable within opening 16 of jacket 14. The first ends 18 and 22 and the second ends 20 and 24 are not fixed or constrained with respect to each in cable 10.

In FIG. 2, cable 10 has now been exposed to a second temperature below the first temperature. Fiber 14 has a thermal coefficient of expansion which is relatively smaller than a thermal coefficient of expansion of jacket 12. At the second temperature, jacket 12 has contracted much more than fiber 14. Ends 22 and 24 of fiber 14 extend beyond ends 18 and 20, respectively, of jacket 12. Ends 22 and 24 of fiber 14 are unconstrained at ends 18 and 20, respectively, and are free to move beyond ends 18 and 20, as shown. Ends 22 and 24 extend beyond ends 18 and 20 to define an excess length 15 of fiber 14.

Alternatively, one of the first or second ends of fiber 14 and jacket 12 might be constrained with respect to each other provided the opposite ends are unconstrained and fiber 14 is freely movable within opening 16 of jacket 12.

In FIG. 3, cable 10 is now terminated at each of the first and second ends with an optical fiber connector 26. Such optical fiber connectors are well known in the art. To terminate cable 10 at connector 26, jacket 12 and fiber 14 are constrained with respect to each other. While optical fiber connector 26 may provide some degree of movement in compression of fiber 14, connector 26 does not permit fiber 14 to extend beyond connector 26. As shown in FIG. 3, cable 10 is exposed to the second, lower temperature and jacket 12 has contracted to the same extent shown in FIG. 2. In FIG. 3, however, ends 22 and 24 of fiber 14 are now constrained at ends 18 and 20 of jacket 12 by connectors 26. Thus, the contraction of jacket 12 compresses fiber 14 into the same length as jacket 12. Known materials suitable for making optical fiber 12 are essentially incompressible. Excess length 15 of fiber 14 is forced to fit within a shorter length of jacket 12 and is forced into a series of microbends 28 within opening 16. These microbends 28 may cause excess signal loss within cable 10. While cable 10 is shown as a single fiber cable and connectors 26 are described as fiber connectors, it is anticipated that a cable including multiple optical fibers could be substituted for cable 10 and a cable breakout at the end of such a multifiber cable could be substituted for connector 26 within the present invention.

Figure 4:
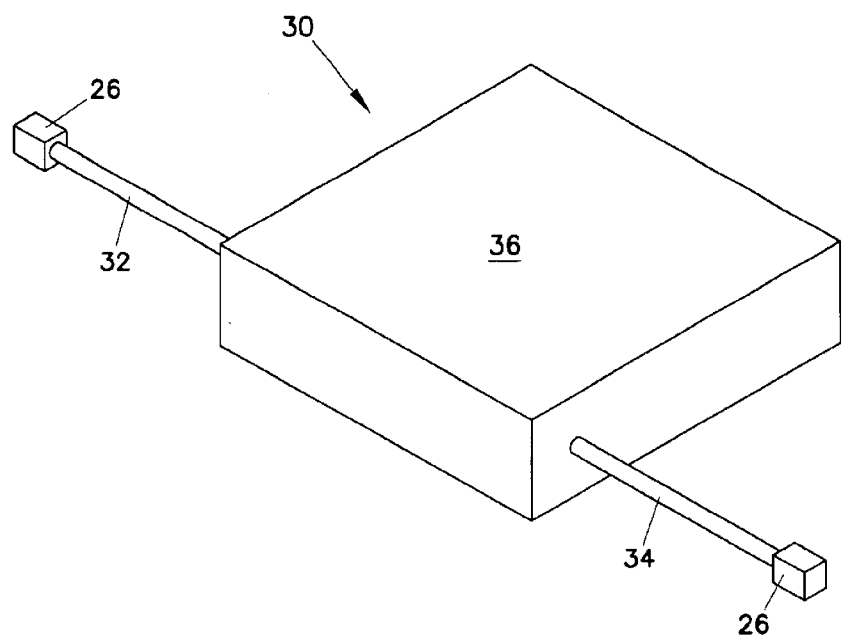
FIG. 4 is a perspective view of an optical fiber cable including a loop housing in accordance with the present invention.
Figure 5:
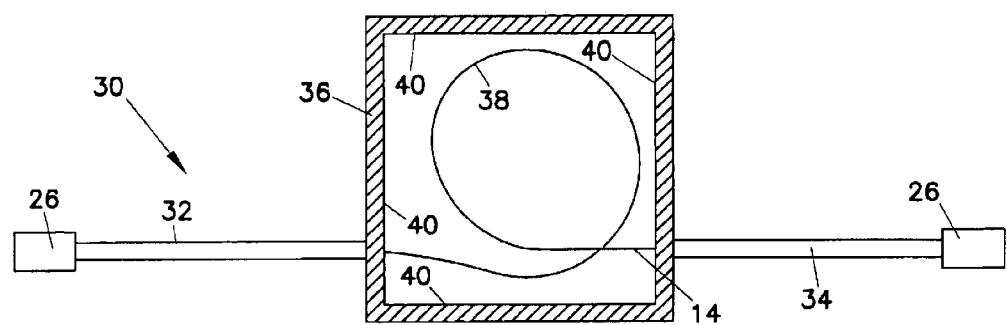
FIG. 5 is a top view of the optical fiber cable of FIG. 4 with the top removed from the loop housing.

Referring now to FIGS. 4 and 5, a cable 30 in accordance with the present invention includes a first jacket segment 32, a second jacket segment 34, fiber 14 and connectors 26 at each end. As discussed above, both fiber 14 and jackets segments 32 and 34 are constrained with respect to each other at connectors 26. Mounted between jacket segments 32 and 34 is a fiber receiving device 36. As shown, the fiber receiving device is a fiber loop box 36. Fiber 14 extends from a first connector 26 through jacket segment 32 into box 36, forms a loop 38 and then extends through jacket segment 34 to a second connector 26.

When cable 30 is exposed to a range of temperatures and jacket segments 32 and 34 extend and contract in response, any excess length of fiber 14 is gathered within box 36. Loop 38 of fiber 14 is sized to fit within box 36 offset from the inner surfaces 40. This will allow loop 38 to grow in size without being limited by inner surfaces 40 as excess length 15 is incorporated within loop 38. Box 36 should be sized to permit the formation of a loop that is greater in diameter than the minimum bend radius of fiber 14.

Figure 5A:
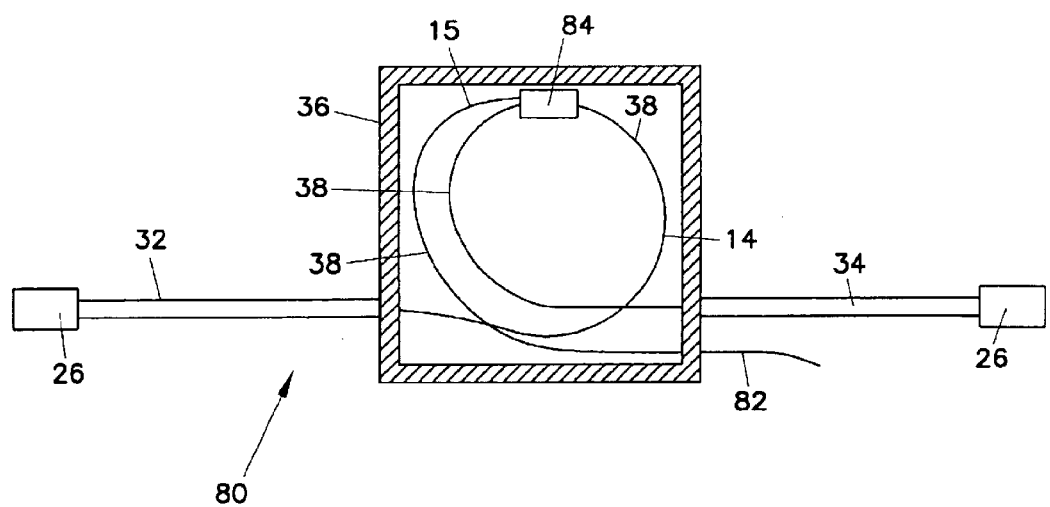
FIG. 5A is a top view of an alternative embodiment of an optical fiber cable in accordance with the present invention including a coupler within a loop housing with the top removed from the housing.

FIG. 5A shows an optical fiber cable 80 similar to cable 30, with the addition of an optical device 84 such as a coupler mounted within box 36. Fiber 14 extends through first cable segment 32 from connector 26 into box 36 forming a loop 38 to receive excess fiber length and is constrained at optical device 84. Within device 84, a portion of the signal transmitted by fiber 14 is tapped or split into a second fiber such as a fiber 82. An extension 15 of fiber 14 is constrained at device 84 and extends out of box 35 through second jacket segment 34 to connector 26. Fiber 82 extends from device 84 out of box 36. Both fibers 15 and 82 form loops 38 within box 36 to receive excess fiber length within box 36.

Figure 6:
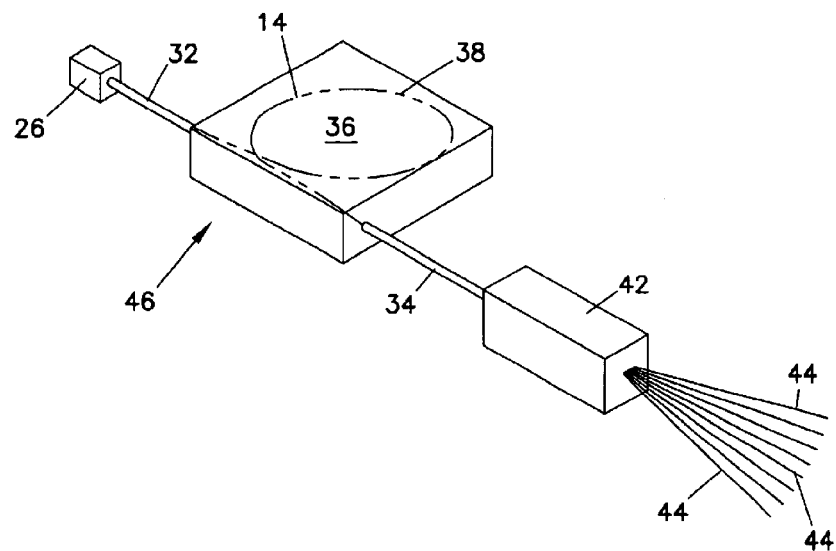
FIG. 6 is a perspective view of an optical fiber cable and splitter in accordance with the present invention.
Figure 12:
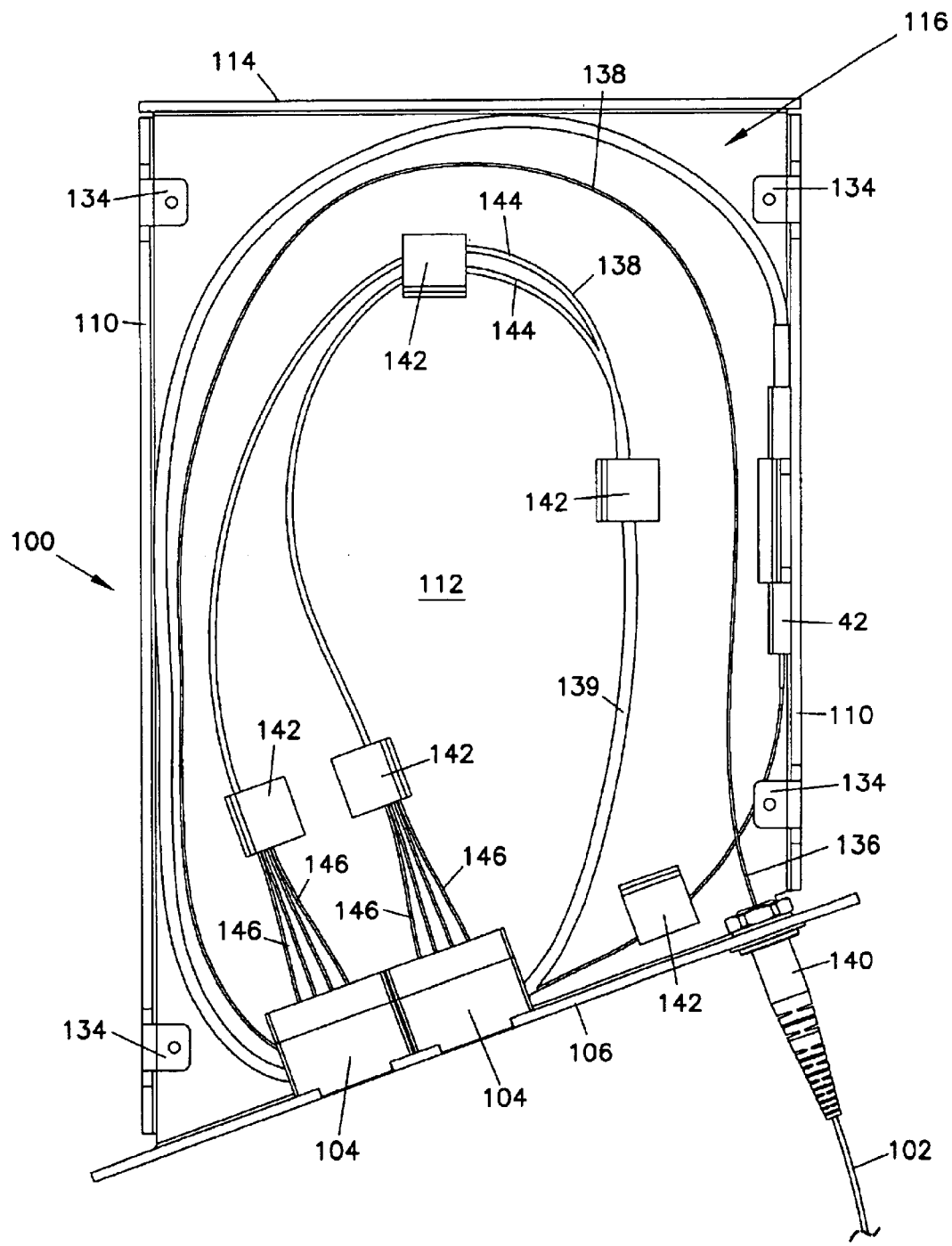
FIG. 12 is a top view of the optical fiber module of FIG. 9, with the top of the module removed to permit visibility of the interior of the module.

FIG. 6 shows an alternative embodiment of an optical fiber cable 46 in accordance with the present invention. Cable 46 includes fiber segments 32 and 34 and fiber loop box 36. Optical fiber 14 (shown within box 36 in hidden lines) within cable 46 is a single strand of fiber carrying a plurality of optical signals simultaneously. Segment 32 and fiber 14 within segment 32 are constrained at one end at connector 26. At a second end of segment 34 of cable 46, a splitter 42 is included. Fiber 14 and jacket segment 34 are constrained with respect to each other at one end of splitter 42. Within box 36, fiber 14 forms a loop 38 to receive any excess fiber that might be formed when jacket segments 32 and/or 34 contract more than fiber 14. At an opposite end of splitter 42 are a plurality of optical fibers 44. Each of these fibers 44 may carry one of the plurality of optical signals from fiber 33 which has been separated from the other optical signals by splitter 42. As shown, eight optical fibers 44 extend from splitter 42. Alternatively, individual fibers 44 could be combined into a single ribbon fiber extending from splitter 42 and the individual fibers 44 broken out from the ribbon cable at a point removed from splitter 42. (Such an arrangement is shown in FIG. 12, below.)

Figure 7:
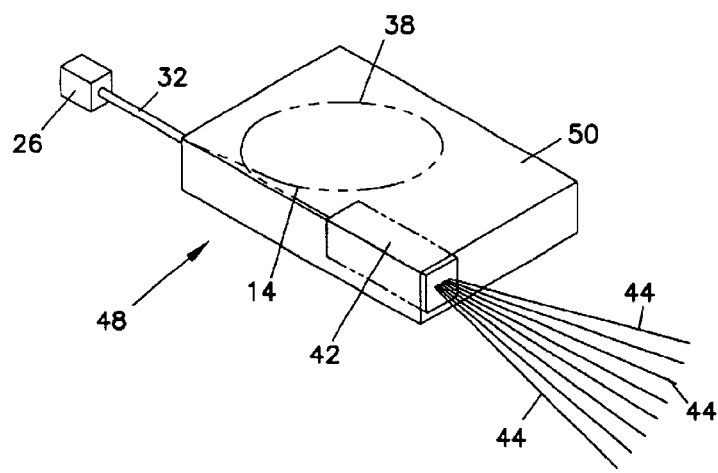
FIG. 7 is a perspective view of an alternative embodiment of an optical fiber cable including a loop housing and splitter mounted within the loop housing in accordance with the present invention, with the fiber and splitter within the housing shown in hidden lines.

FIG. 7 shows a further alternative embodiment of an optical fiber cable 48 including first jacket segment 32 with connector 26 at one end. Segment 32 and fiber 14 within segment 32 are constrained at connector 26. Within a fiber loop box 50 a splitter 42 is mounted so that fibers 44 extend from box 50. Fiber 14 is constrained within box 50 at splitter 42. First jacket segment is constrained at box 50 opposite from connector 26. Cable 48 does not include a second jacket segment 34 within which fiber 33 extends. A loop 38 of optical fiber within box 50 between jacket segment 32 and splitter 42 permits any excess cable length 15 due to contraction of jacket segment 32 to be absorbed without creating microbends which might create undesirable signal loss. As above, fibers 44 could be combined into a single ribbon cable and broken out into individual fibers at a point removed from box 50.

Figure 8:
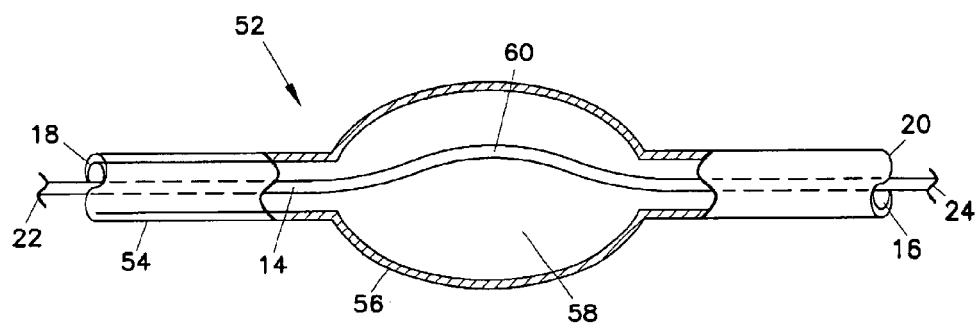
FIG. 8 is a side view with partial cross-section of an alternative embodiment of an optical fiber cable with in accordance with the present invention including an intermediate portion of tubing to receive excess fiber length.

FIG. 8 illustrates a still further alternative embodiment of an optical fiber cable 52 including a wider portion 56 of a cable jacket 54. Within portion 56 is defined an enlarged segment 58 of opening 16 through which fiber 14 extends. As described above, ends 18 and 20 of jacket 54 and ends 22 and 24 of fiber 14 are constrained with respect to each other, respectively. As jacket 54 contracts linearly when exposed to low ambient temperatures, excess fiber length 15 is collected within a curve 60 within enlarged segment 58. Segment 58 is sized to allow accumulation of the anticipated amount of excess fiber length 15 based on the overall length of cable 52 and the percentage of shrinkage calculated at the lowest ambient temperature for which cable 53 is likely to be subjected. This accumulation of excess fiber length 15 with curve 60 will avoid the problem of forcing microbending within opening 16 as shown above in FIG. 3. Alternatively, wide portion 56 and segment 58 could be created in one or more standard sizes and the appropriate size incorporated into cable 52 depending of the length of cable 52 and a standardized lowest expected ambient temperature.

Referring now to FIGS. 9 to 11, a telecommunications module 100 is shown with an input optical fiber cable 102 and a plurality of output optical fiber holders 104 mounted to a front 106. Module 100 includes a housing with a top 108, a pair of opposing sides 110, a bottom 112 (shown in FIG. 12, below), and a back 114. The housing defines an interior 116 (also shown in FIG. 12, below). As shown, module 100 is an optical fiber splitter module, capable of separating an incoming optical fiber signal from cable 102 into up to thirty-two output optical fiber signals, each signal transmitted through an output optical fiber cable 118 terminated at an optical fiber connector 119. One cable 118 is shown in FIG. 10. Each of the optical fiber holders 104 is adapted to hold up to eight output cables 118.

On each of the sides 110 is a mounting rail 120, adapted for mounting module 100 to a telecommunications equipment rack or similar structure. Adjacent sides 110, face 106 includes a pair of flanges 122 with one or more fastener openings 124. Flanges 122 and openings 124 aid with the mounting and secure fastening of module 100 to such a rack or structure. Each of the holders 104 includes eight openings 126, each opening 126 adapted to receive one of the output fibers 118. On front 106 is a space 128 for receiving indicia identifying module 100 or the cables extending to or from module 100. On top 108 is a space for receiving a label 130. As shown, front 106 is angled with respect to back 114 to aid access to front 106 or cables 102 and 118 and to improve the cable management of these cables extending to and from module 100.

FIG. 12 shows module 100 with top 108 removed to show routing of optical fibers within interior 116. Flanges 134 are included along sides 110 for receiving fasteners holding top 108 to module 100. Mounted within interior 116 along one of the sides 110 is splitter 42. An optical fiber 136 from cable 102 extends into interior 116 through front 106. Fiber 136 is formed into a loop 138 within interior 116 before being directed to a first end of splitter 42. An outer jacket of cable 102 is terminated at and constrained to a boot 140 attached to front 106. Fiber 136 extends through loop 138 to splitter 42 about interior 116 to ensure that minimum bend radius requirements to avoid excessive signal loss are maintained. One or more cable clips 142 are mounted to bottom 112 to aid in the layout of cable 136 within interior 116.

Any contraction of the jacket of cable 102 might result in the formation of excess length 15 of fiber 136. Loop 138 provides a place to accumulate any such excess length 15 and avoid the creation of undesirably tight bends of fiber 136 within module 100 or cable 102.

A plurality of ribbon cables 144 extend from splitter 42 opposite fiber 136. Splitter 42 separates the optical signals carried by fiber 136 into up to thirty-two individual optical signals. Each ribbon cable 144 may include up to eight fibers 146, each fiber carrying one of those optical signals. Ribbon cables 144 extend from splitter 42 to mounting holders 104 in front 106. Ribbon cables 144 form a loop 148 within interior 116 between splitter 42 and holders 104. Cable clips 142 are provided to aid in the routing and organization of loop 148 of cables 144 and cables 146 within interior 116. Loop 148 is shown in ribbon cables 144 with fibers 146 being broken out from ribbon cables 144 shortly before fibers 146 enter openings 126 of holders 104. Alternatively, individual fibers 146 could extend from splitter 42 about loop 148 with no ribbon cables included within interior 116.

Fibers 146 are freely slidable within jackets of cables 118 and both the jacket and fibers 146 are terminated and constrained at connector 119. Cables 118 are also constrained at holders 104, as will be described further below. Fibers 146 extend through holder 104 to ribbon cables 144 and ribbon cables 144 are constrained at splitter 42. In one alternative where fibers 146 extend from holders 104 to splitter 42, fibers 146 are constrained at splitter 42. Any excess length 15 of fiber 146 within cable 118 created due to contraction of the jacket of cable 118 is accumulated within interior 116 by loop 148.

Figure 13:
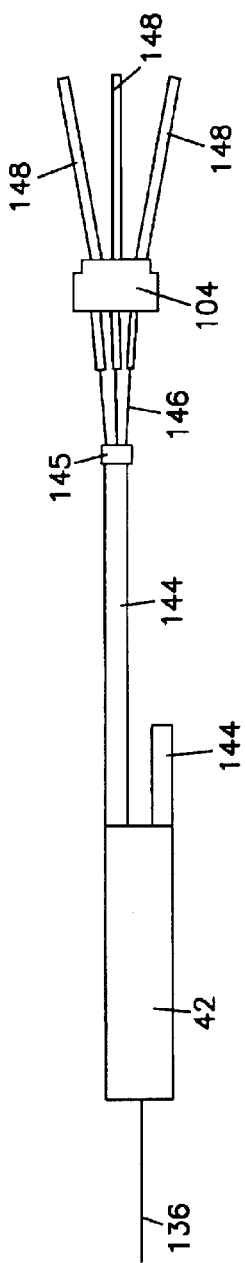
FIG. 13 is a top view of a generalized layout of the optical fibers within the module of FIG. 9.

FIG. 13 shows a generalized top view of the elements within interior 116. Only one of the ribbon cables 144 is shown completely and it should be understood that the other ribbon cables 144 are similarly constructed. At an end 145 of ribbon cable 144 individual fibers 146 are broken out. Only three fibers 146 are shown for clarity. Fibers 146 extend through an opening 126 of one of the holders 104 within a furcation tube assembly 148.

FIG. 14 shows an inner face 105 of holder 104 with one furcation tube assembly 148 within one of the openings 126. Furcation tube assembly 148 includes a hollow inner tube 150 and a hollow outer tube 152. Outer tube 152 includes an opening within which inner tube 150 in inserted. Other elements may also be included within the opening of outer tube 152 about inner tube 150. These elements may include but are not limited to strength members or similar elements. Inner tube 150 includes an opening through which fiber 146 may be slidably inserted.

FIGS. 15 and 16 show furcating tube assembly 148 in additional detail, including a mounting collar 154 with a front portion 153 sized to be inserted within one of the openings 126 of holder 104. Front portion 153 may be slightly oversized within respect to opening 126 to promote a friction fit within opening 126. Alternatively, an adhesive or some mechanical means may be used to secure mounting collar 154 within opening 126. Mounting collar 154 includes a central hollow opening through which inner tube 150 extends. A rear portion 155 of mounting collar 154 is sized to extend within the opening of outer tube 152 about inner tuber 150. A strength member 158 is shown in FIG. 16 extending from between inner tube 150 and outer tube 152. Strength member 158 as shown is an aramid fiber such as Kevlar but other suitable materials may also be used. When rear portion 155 is positioned between inner tube 150 and outer tube 152, strength member 158 is overlapped onto rear portion 155. A crimp sleeve 156 is fit about outer tube 152 above rear portion 155 of mounting collar 154 and crimped to hold these elements together. An adhesive may also be applied at location 160 where inner tube 150 extends through mounting collar 154 to ensure that inner tube 150 remains fixed within assembly 148.

Figure 17:
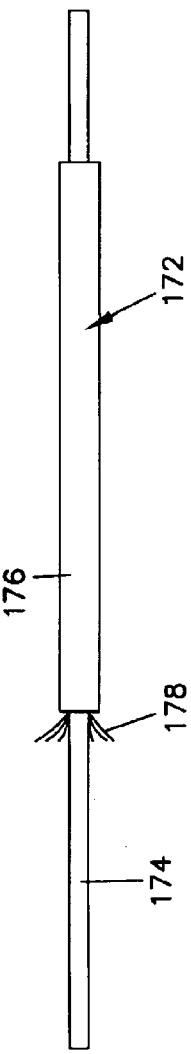
FIG. 17 is a side view of an optical fiber up-jacket assembly for sheathing the single input fiber to the splitter.
Figure 18:
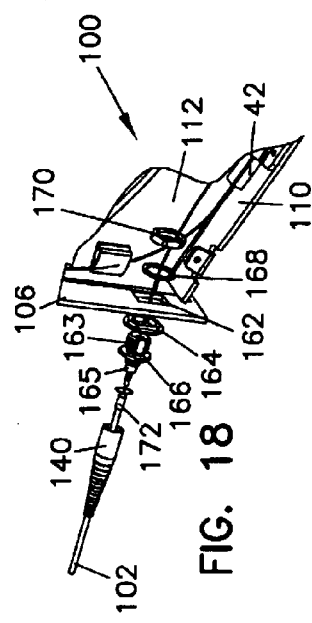
FIG. 18 is a rear exploded perspective view of the single input fiber extending through the front of the module of FIG. 9.

FIGS. 17 and 18 show additional details of input fiber 102 and boot 140 and their assembly to module 100. An opening 162 in front 105 receives an insert 164 and a threaded portion 163 of a cable mount 166 from outside module 100. Within interior 116 a washer 168 and a nut 170 are placed over threaded portion 163 of mount 166 and secure mount 166 to front 106. In FIG. 17, an outer jacket assembly 177 for input cable 102 includes a hollow inner tube 174 with an opening to receive optical fiber 136. A hollow outer tube 176 is positioned about inner tube 174 and a strength member 178 is positioned between the inner and outer tubes.

Inner tube 174 is inserted through cable mount 166 so that strength member 178 is positioned about as crimp portion of cable mount 166. A crimp sleeve 172 is positioned outer tube 176 and strength member 178 and crimped about crimp portion 165 to hold these elements together. Boot 140 is positioned about crimp sleeve 172 to provide strain relief and protection to cable 102 and its connection to module 100.

The above specification, examples and data provide a complete description of the manufacture and use of the invention. Since many embodiments of the invention can be made without departing from the spirit and scope of the invention, the invention resides in the claims hereinafter appended.

What is claimed is as follows:

1. An optical fiber cable assembly comprising:
   an optical fiber slidably enclosed within a hollow tubing, both the fiber and the tubing having corresponding first and second ends;
   the cable being terminated with the first ends of the tubing and the fiber constrained with respect to each other and the second ends of the tubing and the fiber constrained with respect to each other, such that fiber and the tubing are approximately the same length when at a first temperature;
   the tubing is made of a material which contracts more than the optical fiber when the cable is exposed to temperatures below the first temperature, such that the fiber is longer than the tubing and excess fiber length is formed; and
   wherein a fiber receiving device permits the excess fiber length to accumulate without bending in a radius smaller than a minimum bend radius.

2. The optical fiber cable of claim 1, wherein the fiber receiving device includes an intermediate portion of the tubing which permits the excess fiber length to accumulate without bending in a radius smaller than a minimum bend radius.

3. The optical fiber cable of claim 1, wherein the fiber receiving device includes a box, a first and a second intermediate end of the tubing attached to the box and the fiber passing through the box.

4. The optical fiber cable of claim 3, wherein the optical fiber forms a loop within the box.

5. The optical fiber cable of claim 2, wherein the intermediate portion of the hollow tubing defines a greater inner diameter than the remainder of the tubing.

6. The optical fiber cable of claim 1, wherein the first end of the fiber and the first end of the tubing are terminated at an optical fiber connector.

7. The optical fiber cable of claim 6, wherein both the first and second ends of the fiber and the tubing are terminated by an optical fiber connector.

8. The optical fiber cable of claim 6, wherein the second end of the fiber and the second end of the tubing are terminated at an optical signal splitter.

9. An optical fiber cable assembly comprising:
   an optical fiber slidably enclosed within a hollow tubing, both the fiber and the tubing having corresponding first and second ends;
   the second ends of the fiber and the tubing terminated together and constrained with respect to each other;
   the first end of the fiber constrained beyond where the first end of the tubing is constrained;
   wherein the cable is assembled at a first temperature and at a second lower temperature the tubing shrinks in length relative to the fiber and any excess fiber length accumulates beyond the first end of the tube.

10. The optical fiber cable assembly of claim 9, wherein the first end of the tubing is constrained at an outer wall of a housing of a module and the first end of the fiber is constrained within an interior of the module at one end of an optical component.

11. The optical fiber cable assembly of claim 10, wherein the optical component within the module is a splitter.

12. The optical fiber cable assembly of claim 11, wherein a plurality of optical fibers extend from the splitter.

13. The optical fiber cable assembly of claim 9, wherein the second ends of the fiber and the tubing are constrained at an optical fiber connector.

14. The optical fiber cable assembly of claim 10, wherein the module further includes a an input optical fiber cable, the input optical fiber with an optical fiber slidably received within a hollow tubing, the fiber and the tubing having corresponding first and second ends, the first ends of the tubing and the fiber constrained with respect to each other, the second end of the input cable tubing constrained at a front of the module and the second end of the input cable fiber constrained within the interior of the module at a second end of the optical component, the fiber of the input cable forming a loop within the interior which accumulates any excess length of fiber formed by a contraction of the tubing of the input cable.

15. The optical fiber cable assembly of claim 14, wherein the contraction of the tubing of the input cable is due to a decrease in temperature.

16. An optical fiber cable assembly comprising:
   an optical fiber slidably enclosed within a hollow tube, both the fiber and the tube having corresponding first and second ends;
   the first ends of the fiber and the tube terminated and constrained with respect to each other;
   the second end of the tube constrained at a cable loop box with the second end of the fiber extending into an interior of the cable loop box;
   the second end of the fiber constrained at an optical device mounted within the fiber loop box;
   the fiber formed into a loop within the fiber loop box between the second end of the tubing and the second end of the fiber;
   wherein the cable is assembled at a first temperature and at a second lower temperature the tubing shrinks in length relative to the fiber to form an excess length of fiber and any excess fiber length accumulates in the loop of fiber within the fiber loop box.

17. The optical fiber cable assembly of claim 16, wherein the optical device is a splitter.

18. The optical fiber cable assembly of claim 16, wherein the first ends of the fiber and the tuber are terminated at a connector.

19. The optical fiber cable assembly of claim 16, further comprising a second fiber extending from the optical device and out of the box into a second hollow tube, the second fiber and the second tube having corresponding first and second ends, the first end of the fiber constrained at the optical device, the first end of the tube constrained at a wall of the box, the second ends of the second fiber and the second tube terminated and constrained with respect to each other, the second fiber forming a loop within the box between the first end of the fiber and the first end of the tube for receiving excess fiber length formed by the contraction of the tube.

20. The optical fiber cable assembly of claim 19, wherein the second ends of the second fiber and the second tube are terminated at an optical fiber connector.

21. The optical fiber cable assembly of claim 19, wherein the optical device is a splitter and a plurality of second fibers extend from the splitter out of the box into a plurality of second tubes.

22. A method of assembling an optical fiber cable comprising:

providing an optical fiber and a hollow tubing, the tubing is made of a material which contracts more than the optical fiber when the cable is exposed to temperatures below the first temperature both the fiber and the tubing having first and second ends;

sliding the fiber within the tubing;

providing a fiber receiving device between the first ends of the fiber and the tubing and the second ends of the fiber and the tubing;

terminating the cable with the first ends of the tubing and the fiber constrained with respect to each other and the second ends of the tubing and the fiber constrained with respect to each other, such that fiber and the tubing are approximately the same length when at a first temperature;

exposing the cable to a second temperature lower than the first temperature and forming excess fiber length as the tubing contracts more than the fiber;

accumulating the excess fiber within the fiber receiving device without bending in a radius smaller than a minimum bend radius.

23. A method of assembling a fiber optic splitter module comprising:

providing a splitter with at least one optical fiber extending from opposing ends of the splitter, each of the optical fibers having a first end constrained at the splitter and an opposing second end;

placing the splitter within an interior of a housing;

forming each optical fiber into a loop within the housing and extending the second end outside of the housing;

sliding a hollow tube over the second end of each optical fiber such that a first end of each tube is constrained at an outer wall of the housing and a second end of each tube is adjacent the second end of the fiber within the tube;

terminating constraining with respect to each other the second ends of the tubes and the fibers within the tube;

accumulating any excess length of fiber creating by contraction of the tube within the loop inside the housing.

* * * * *

UNITED STATES PATENT AND TRADEMARK OFFICE
CERTIFICATE OF CORRECTION

PATENT NO. : 6,885,798 B2
DATED : April 26, 2005
INVENTOR(S) : Steven Zimmel

It is certified that error appears in the above-identified patent and that said Letters Patent is hereby corrected as shown below:

Column 6,
Line 56, "Altermatively" should be -- Alternatively --.
Line 65, "Keviar" should be -- Kevlar --.

Column 8,
Line 33, the phrase "a an" should be -- an --.

Column 10,
Line 32, the word "creating" should be -- created --.

Signed and Sealed this

Fourth Day of October, 2005

JON W. DUDAS
*Director of the United States Patent and Trademark Office*